United States Patent [19]

McKelvey

[11] Patent Number: 4,818,284

[45] Date of Patent: Apr. 4, 1989

[54] INK RECLAMATION SYSTEM

[75] Inventor: John L. McKelvey, Lakeland, Fla.

[73] Assignee: The Ink Company, Sacramento, Calif.

[21] Appl. No.: 137,235

[22] Filed: Dec. 22, 1987

[51] Int. Cl.$^4$ .............................................. C09D 11/02
[52] U.S. Cl. ...................................... 106/20; 210/917;
210/774; 210/781; 210/787
[58] Field of Search .................. 106/20; 210/917, 774,
210/781, 787, 179, 360.1

[56] References Cited

U.S. PATENT DOCUMENTS 4,391,638  7/1983  Fusco et al. ........................... 106/20
4,565,638  1/1986  Zucker ................................. 210/774

Primary Examiner—Paul Lieberman
Assistant Examiner—Christine Skane
Attorney, Agent, or Firm—Stetina and Brunda

[57] ABSTRACT

An improved method and system for reclaiming waste printing ink is disclosed. The inventive method is characterized by the initial heating and agitation of a quantity of undiluted waste ink. Such heating and agitation is carried out at a temperature and for a period of time sufficient to (a) volatilize water, and/or other liquids contained therein; and (b) reduce the viscosity of the waste ink to a viscosity which is suitable for subsequent processing. After the period of heating and agitation, the waste ink is centrifuged to separate paper lint and other fibrous particulate contaminants from the ink. The reclaimed clarified ink is then blended with virgin ink at a ratio which provides a press-ready reclaimed ink/virgin ink blend. The system of the present invention provides a system of vessels, lines, valves, pumps and attendant apparatus whereby the inventive method may be practiced.

12 Claims, 3 Drawing Sheets

INK RECLAMATION SYSTEM

The present invention relates generally to the art of reclaiming printing ink and, more particularly, to a means and method whereby reclaimed printed ink is prepared for subsequent reutilization.

Several methods of ink printing are well known in the art. One such method is termed "offset" printing. Generally, in the offset printing process, an engraved plate is clamped to a first rotating cylinder. As the first cylinder rotates, it comes in contact first with a dampening roller and then with an inking roller. The dampening roller wets the non-engraved regions of the plate with water or other liquid which will repel ink from these non-printing regions of the plate. The inking roller thereafter applies ink only to the printing regions of the plate. The inked images are then transferred from the plate to a separate rubber blanket which is positioned on a second rotating cylinder. A paper is passed between the "blanket" cylinder and a coacting "impression" cylinder so as to result in transfer of the inked images to the surface of the paper. Excess ink which is not utilized in the process is periodically removed from the rollers and cylinders and is collected as waste. Such waste ink may contain water and other fluids used in the process as well as solid particles of cellulose fiber and lint from the paper. The volume of particulate matter found in the waste ink varies, of course, with system parameters such as the composition and quality of paper used. Also, remaining ink may be washed from the blanket by certain blanket wash solvents and thus, varying amounts of such solvents may be contained in the waste ink. Such blanket wash solvents generally comprise volatile organic solvents capable of soluabilizing the ink.

At normal abmient temperatures, offset printing ink is highly viscous material. Even the vehicle (oil and varnish) without pigment is viscous. Such viscosity gives rise to problems when reclamation of the waste ink is attempted because the waste ink is typically subjected to mechnical filtration for the purpose of removing the above-discussed particulate and fibrous contaminants. As a practical matter, the degree of filtration required to remove the such contaminants cannot be achieved without first substantially lowering the viscosity of the waste ink. Additionally, cellulose fibers and paper lint are known to imbibe oil and other fluids which are routinely contained in the waste ink mixture. As a result, such particles may clump together, thereby giving rise to additional processing problems due to variations in viscosity or nonhomogeneity. Finally, the free water, blanket wash solvents and other liquid contaminants may be not removed by the processes of mechanical filtration. Thus, the waste ink must be subjected to some separate process to effect separation of such waste water, solvents and other liquids.

The desirability of reclaiming waste ink derives not only from the economic incentive to reuse expensive printing fluids but is also motivated by the significant disposal problems presented by such materials. Waste offset printing ink is generally known to be toxic and may be subject to federal, state and local laws governing the disposal of hazardous materials. Because of possible toxicity to humans or animals, disposal of waste ink is a relatively expensive process which is time consuming and fraught with concerns of safety. In view of the technical difficulty and potential public safety and legal considerations associated with the disposal of such toxic materials, there exists a further incentive to reuse waste printing ink wherever possible.

Systems for reclaiming printing ink have heretofore included various means of reducing the viscosity of the ink, filtering the ink to remove entrained particulate matter, separating water and other liquids from the ink, and subsequently blending the reclaimed waste ink with virgin ink to obtain an acceptable material for use in printing.

An early process of renovating waste ink by centrifugation is disclosed in U.S. Pat. No. 181,597 issued to Robertson. Robertson describes a method for preventing the dessication of stored waste oil by flooding the surface of the oil with a layer of water and subsequently removing particular contaminates from the waste ink by centrifuging the waste ink in a sieve-like centrifuge having an internal strainer basket. Robertson also teaches a removal of ink from ink-soaked rags by placing the contaminated rags within the device wherein they are subsequently subjected to centrifugal force.

U.S. Pat. No. 4,391,638 issued to Fusco discloses a more recent method for reclaiming waste printing ink wherein the waste ink is initially diluted with ink oil or virgin ink in order to adjust the viscosity of the waste ink to within processable range. Thereafter, free water and waste fibrous material is centrifugally separated from the diluted waste ink. Fusco also teaches specifically heating the ink oil/waste ink mixture for the purpose of further reducing the viscosity of such mixture and thereby minimizing the amount of ink oil required.

The initial oil dilution step of U.S. Pat. No. 4,391,638 provides a generally effective means of adjusting the viscosity of the waste ink, however, it must be recognized that such initial oil dilution is also costly, time consuming and subject to human error. Over-dilution of the waste ink may result in a final product which is too low in viscosity to be usable. Alternatively, underdilution of the waste ink may allow the material to remain at a viscosity which is higher than that at which the material may be processed. Such may result in subsequent clogging of screens, pumps, etc. In addition to problems associated with viscosity, the process of initially diluting the waste with oil or virgin ink is time consuming and expensive. Because the initial oil dilution taught by Fusco occurs prior to heating of the waste ink, it may be difficult to achieve blending of the oil into the viscous, room temperature ink.

Thus, there exists a need in the art for a system of reclaiming waste printing ink without requiring the step of initial oil dilution. Accordingly, the present invention contemplates an improved ink reclamation system which overcomes the above-described deficiencies of the prior art by providing a simple, economical and feasible method of reclaiming printing ink without the addition of ink oil or virgin ink to the waste ink prior to clarification and reclamation.

BRIEF SUMMARY OF THE INVENTION

The present invention is particularly applicable to waste ink obtained from "offset" printing equipment and will be described with particular reference thereto, although it must be appreciated that the invention has broad applicability and may be used with various types of printing inks as well as other liquids, slurries and suspensions wherein the overall viscosity and/or solid content precludes the clarification or filtration of such material by standard processing techniques.

In accordance with the invention there is provided a method and system for reclaiming waste ink whereby a quantity of undiluted waste ink is initially held in a heated agitated reservoir for a period of time and at a temperature sufficient to: (a) drive off excess water and blanket wash solvents and to (b) lower viscosity of the waste ink to a viscosity which is acceptable for subsequent centrifugation and processing. After the initial period of heating and agitation, the waste ink is transferred to a centrifuge wherein entrained cellulose fibers, paper lint and other particulate solids are removed by centrifugation. Finally, the ink is blended with a quantity of virgin ink at a ratio which will provide a press ready final product having the desired properties of tack, color, viscosity, pigment concentration, etc.

In accordance with another aspect of the present invention, individual portions of waste ink are periodically deposited in a waste ink dump tank and held therein until such time as a sufficient quantity of waste ink has been collected within such dump tank to justify further processing of such quantity of waste ink. A load cell may be provided to sense when the fluid within the dump tank reaches a predetermined level, at which such further processing is feasible. An advantage of such pooling of the waste ink is that a portion of the water and other waste liquids contained therein will separate and accumulate on the surface of such pooled waste ink. The accumulated layer of liquid may then be removed prior to transfer of the waste ink from the waste ink dump tank to the heating and agitation vessel. The removal of such liquid layer may be achieved through the use of a hand held aspiration pump or the like.

In accordance with another limited aspect of the present invention the step of heating and agitating the waste ink is carried out in a waste ink heating unit comprising a tank-like vessel having a thermostated heating unit and a mechanical mixing means positioned therein.

In accordance with yet another aspect of the present invention the centrifugation of the waste ink is accomplished by pumping a metered amount of waste ink from the agitated waste ink heating unit into a separate waste ink centrifuge. In the centrifuge the heated waste ink undergoes angular acceleration to a predetermined velocity and is held at such rotational velocity for a period of time sufficient to separate the clean ink from the solid particulate matter contained therein. The clarified ink fraction is then drained or decanted into a separate clarified ink catch tank.

In accordance with a further aspect of the invention the reclaimed clarified ink is transferred from the catch tank into a separate blend tank wherein the reclaimed clarified ink is blended with a predetermined amount of virgin ink to provide a virgin ink/reclaimed ink blend having properties acceptable for subsequent use in printing.

In accordance with another aspect of the present invention there is provided an interconnecting system of lines, pumps and strainers adapted to move the ink through the various steps of the process and through the various component elements of the system (i.e. waste ink dump tank, to waste ink heating and agitating unit, to waste ink centrifuge, to clarified ink catch tank, to blend tank with agitator, to printing press).

In accordance with yet another aspect of the present invention the waste ink centrifuge of the system is adapted to angularly accelerate the mixture contained therein to approximately 12,000 gs, thereby effecting substantial separation of the particulate contaminates from the clean ink.

In accordance with a still further aspect of the present invention the blending of the reclaimed clean ink with virgin ink is carried out at a ratio determined to provide a final ink viscosity, at room temperature, of approximately 200 poise. It is anticipated that in most installations wherein the ink being treated is offset printing ink, it will be possible to utilize a virgin ink to reclaimed ink ratio of less than approximately 4:1, and frequently as low as 2:1 or 1:1 in order to obtain press-ready ink having the desired properties such as tack, color, viscosity, etc.

In accordance with an even further aspect of the present invention the waste ink is held in the waste ink heating and agitating tank at a temperature of approximately 180 degrees F. for a period of 12 to 14 hours in order to drive off excess water and blanket wash solvents and also to lower the viscosity of the ink for subsequent centrifugation. This is accomplished without the addition of virgin ink or ink oil for the purpose of diluting the waste oil and reducing the viscosity thereof.

In accordance with a still further aspect of the invention, the waste ink held within the heating and agitating tank is agitated by a mechanical mixer designed specifically to provide constant agitation of the waste ink without unnecessary foaming or frothing.

In accordance with an even further aspect of the present invention there may be provided a programmable controller adapted to open and close valves and actuate and deactuate pumps in predetermined sequence and/or upon receiving signals from various liquid level sensors, limit switches, pressure transducers and the like, thereby achieving efficient operation of the inventive system in a full or partially automated manner.

The principal object of the invention is to provide a system for reclaiming waste printing ink without requiring the initial dilution of the waste ink with virgin ink or ink oil.

A further object of the present invention is to provide a method for reclaiming waste printing ink which contains substantial amounts of paper lint and other solid contaminants.

Another object of the invention is to provide a method and system whereby water, blanket wash solvents and other liquid contaminants may be removed from the waste ink without dilution of said waste ink by virgin ink or ink oil.

A still further object of the present invention is to provide a system of the foregoing character which is fully automated through the use of a programmable controller or relays and timers, thereby minimizing the likelihood of human error and maximizing efficiency of the system.

Further objects and advantages of the invention will be apparent from the following detailed description of a preferred species thereof and the accompanying drawings.

The inventive method may be practiced by carrying out specific steps while the inventive system may take physical form in certain devices and arrangements of devices. Preferred embodiments of both are illustrated in the accompanying drawings which form a part hereof.

DETAILED DESCRIPTION OF PREFERRED EMBODIMENTS

The ink reclamation process of the present invention finds particular utility in the reclamation of offset printing press ink from high volume printing operations such as newspaper plants. Thus, as described herein, a preferred embodiment of the invention is specifically suited to use with commercial newspaper operations which utilize the offset printing process.

Figure 1:
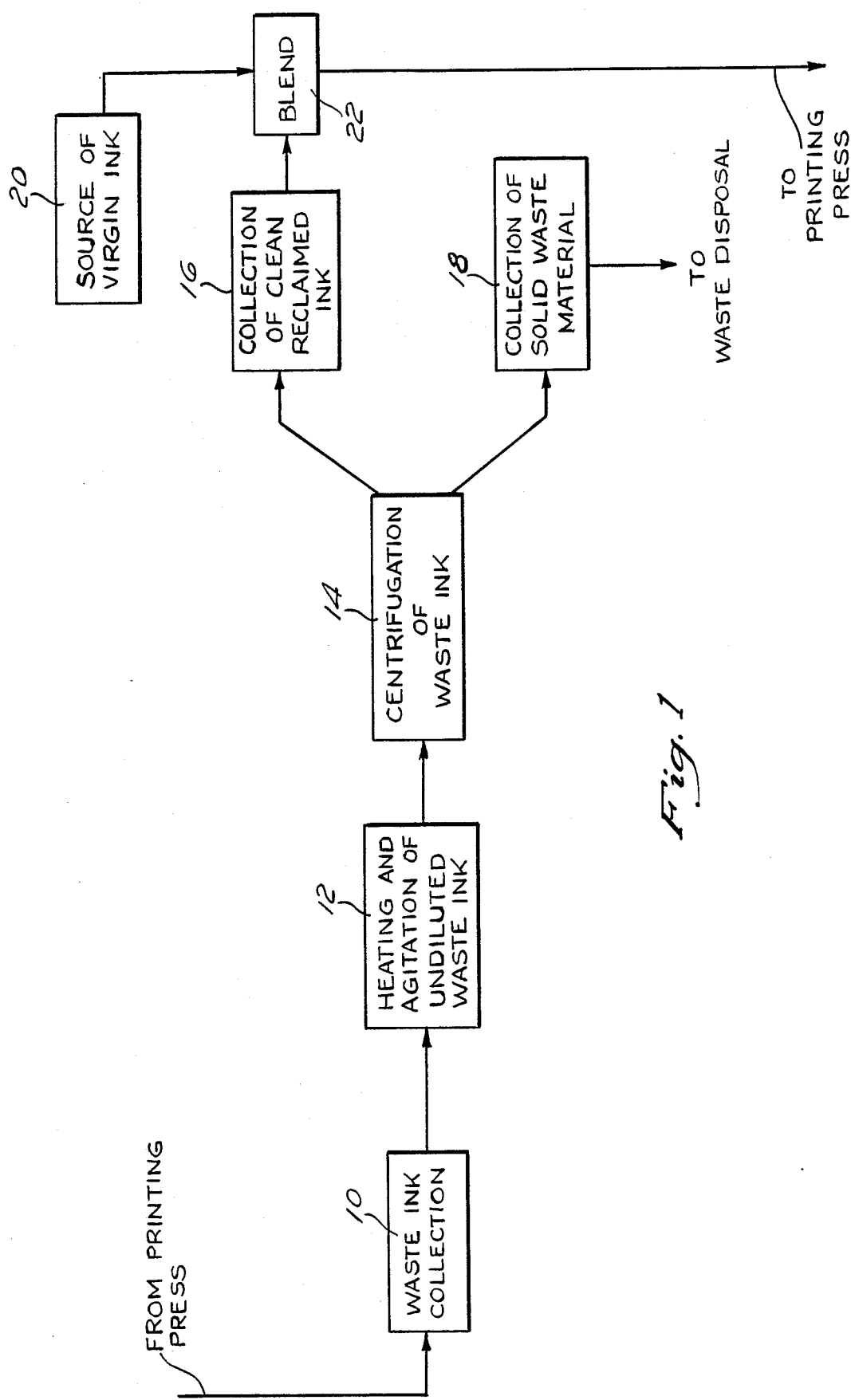
FIG. 1 is a process flow diagram of an ink reclamation system in accordance with the present invention.

Referring now to the drawings wherein the showing is for the purpose of illustrating preferred embodiments of the invention and not for the purpose of limiting the scope of the inventive concept, FIG. 1 comprises a process flow diagram depicting the basic steps in the process of the present invention. The first step in the process is the collection of waste ink 10. The waste ink so collected will presumably be obtained from an operational printing press, will be initially coarsely screened to remove large clumps and foreign objects and will be pooled in a collection vessel until such time as sufficient waste ink has been collected to proceed with processing. When the waste ink is pooled in the collection vessel for an appreciable period of time (e.g. ten hours), it has to be expected that a layer of water or other liquid will separate out and collect on the surface of the waste ink. When sufficient waste ink has been collected, the water or other liquids which have collected on the upper surface of the pooled waste will be aspirated away and discarded. The quantity of waste ink is then transferred to a separate vessel wherein the second step of heating and agitation of the undiluted waste ink 12 is carried out. Such heating and agitation is routinely carried out at 180 degrees F. for 12-14 hours, however, any temperature or time period may be used as required to accomplish the desired volitalization of liquids and lowering of viscosity. Additionally, negative pressure may be applied to the heating and agitation unit, as required, to accomplish the desired volatilization of liquids.

After the step of heating and agitation of the undiluted waste ink 12 has been completed, the viscosity of the waste ink will have been substantially reduced. The heated ink is then transferred to a separate centrifuge vessel for the subsequent step of centrifugation 14. Such centrifugation 14 accomplishes an angular acceleration of the waste ink to a rotational velocity sufficient to substantially separate out any solid waste material contained in the waste ink. After the completion of such centrifugation step 14 the clarified ink fraction is collected 16, thereby providing a quantity of "reclaimed" clarified ink. The solid waste material obtained by centrifugation step 14 is separately removed from the centrifuge and collected 18 for subsequent disposal.

Generally, the collection 16 of reclaimed clarified ink from the centrifugation process 14 is carried out by decanting or otherwise transferring the reclaimed ink from the centrifuge into a separate collection vessel. A separate source of virgin ink 20 is provided. Such virgin ink is blended 22 with the collected clean reclaimed ink to provide a virgin/reclaimed ink blend having the desired properties. Such blend is then used in printing. Of course, samples of the reclaimed, clarified ink collected in step 16 will be checked to insure that all particulate matter has been removed. If any particulate matter is found to remain following the collection step 16, such reclaimed clarified ink may then be subjected to the inventive process again by reintroducing such ink to the pooled waste in collection 10 or into the vessel in which the heating and agitating step 12 is carried out.

Figure 2A:
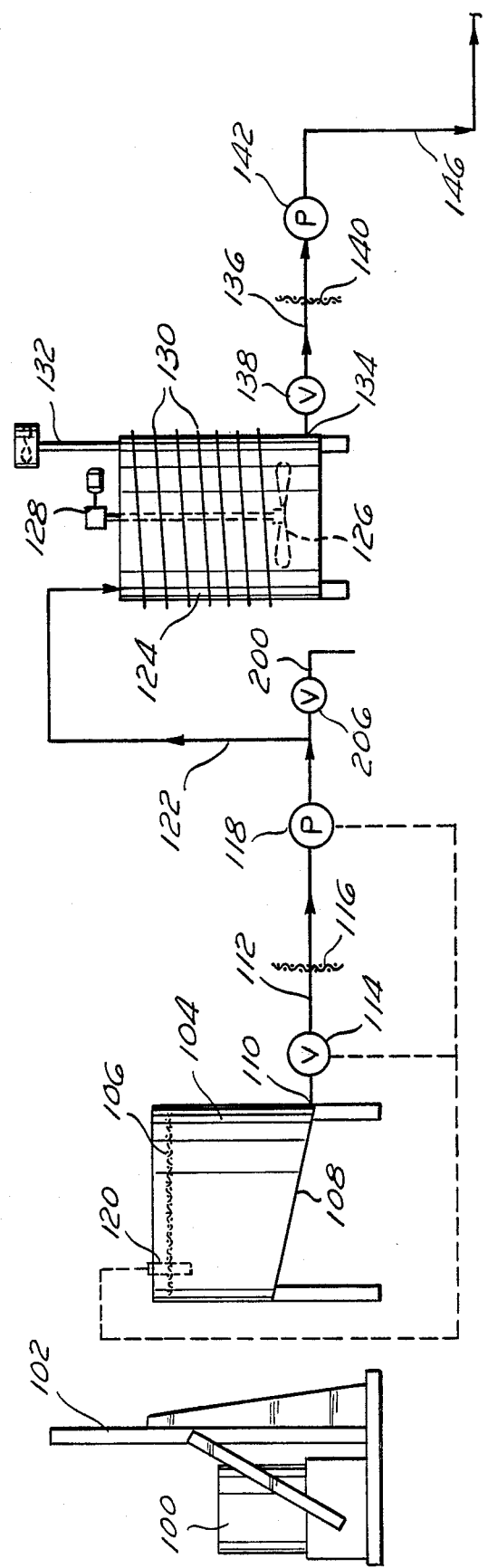
FIG. 2 is a schematic elevational view representing a combination of devices by which the process of the present invention may be practiced.
Figure 2B:
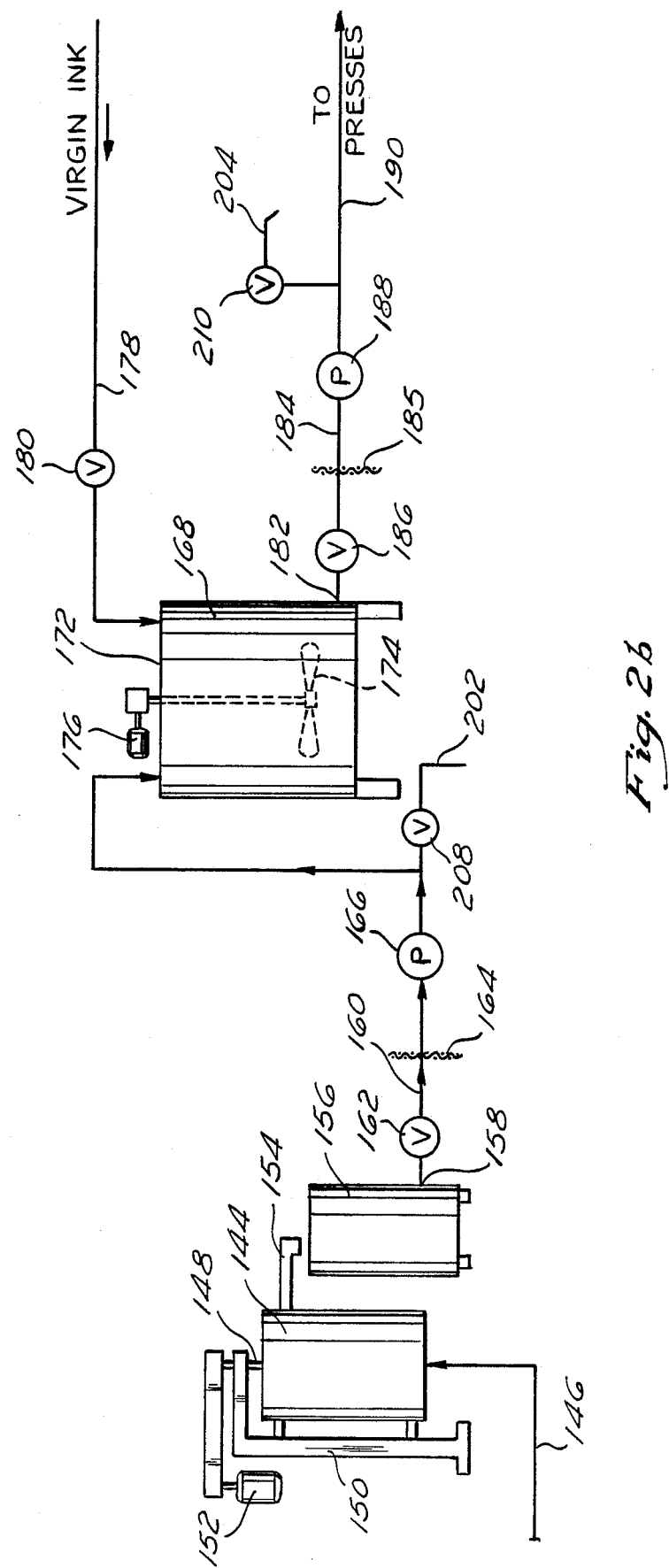

FIGS. 2a and 2b are a schematic representation of a preferred system by which the inventive process may be practiced. The waste ink is initially collected and/or stored in standard fifty-five gallon drums 100. In this preferred embodiment a mechanical drum dumping device 102 is utilized to dump the contents of each drum 100 into a waste ink dump tank 104, however, it should be understood that a drum pump may also be used to off load the contents of drums 100 into dump tank 104.

The waste ink dump tank 104 preferably comprises a generally cylindrical, open top bin having a coarse screen 106 covering its open top. Such screen serves to coarsely screen out large masses of particulate matter and to prevent the entry of large foreign objects into the waste ink dumping tank 104. Waste ink dump tank 104 is further provided with a sloped bottom 108 with a drain port 110 at the lowest point thereof so as to provide for complete emptying of the waste ink from the interior of dump tank 104 through a bottom drain line 112 which is connected to drain port 110. A first valve 114 is located within drain line 112 near its connection to the dump tank drain port 110. A first strainer 226 having $\frac{1}{4}"$ diameter screen is positioned in line 20 just ahead of first transfer pump 118. A load cell 120 senses the weight of the contents of dump tank 104 and is operatively connected to first transfer pump 116 and valve 114 such that when the waste ink in dump tank 104 reaches a predetermined weight, load cell 120 will signal valve 114 to move to an open position and will trigger or energize pump 118, thereby pumping the waste ink from dump tank 104. While a probe-type liquid level sensor may be used to achieve this same function, it has been found that the use of a load cell avoids problems associated with caking and drying of ink on exposed probe-type level sensors.

The output side of pump 118 is fluidly connected by line 122 to a separate waste ink heating and agitating vessel 124. Thus, when valve 114 is open and pump 118 is actuated, the waste ink will be transferred from waste ink dump tank 104 through lines 112 and 122 into the waste ink heating and agitating vessel 124. Waste ink heating and agitating vessel 124 is a generally cylindrical covered tank having a mechanical agitator shown by dotted lines 126 positioned therein. The mechanical agitator 126 is driven by an electric motor 128 which is mounted on the top cover of heating and agitating vessel 124. Additionally, heating and agitating vessel 124 is provided with a heating unit 130 located around and/or within the cylindrical walls of the waste ink heating and agitating vessel 124. The waste ink heating and agitating vessel 124 is further provided with sufficient exterior insulation to minimize the rate of heat loss from the interior of the vessel. Additionally, a ventilation port 132 is provided at the top of waste ink heating and agitating vessel 30. Ventilation port 132 may be connected by suitable ventilation plumbing to the exterior of the building in which the ink reclamation system is housed or may be plumbed into a pollution abatement system in the event that such system should be required, or to a condensing unit to reclaim solvent. Thus, the waste ink heating and agitating vessel 124 is equipped to hold a quantity of waste ink for a predetermined period of time, usually about 12-16 hours, during which time the waste ink is continually agitated by mixer 32 and maintained at an elevated temperature generally around 180 degrees F. The temperature at which the waste ink is held is sufficiently high to achieve two effects. First, the elevation in temperature will cause water, blanket wash solvents or other liquid contaminants contained therein to vaporize and be exhausted from the interior of the vessel 30 through ventilation. Also, the elevation in temperature will cause the viscosity of the waste ink to decrease to a viscosity at which the waste ink may be easily pumped, centrifuged and otherwise processed. In the presently preferred embodiment such decreased viscosity is equal to or less than approximately 60 poise. Where fine temperature control is necessary or desired, it should be appreciated that a jacketed tank may be used with hot and cold temperature exchange medium being continually circulated therethrough to maintain a specific, close tolerance temperature range.

The waste ink heating and agitating vessel 124 is further provided with a bottom drain port 134 to which drain line 136 is connected. Line 136 is provided with a valve 138 located near the drain port 134 of the base of waste ink heating and agitating vessel 124. Line 136 is also provided with a second inline strainer 140 having an internal screen of approximately ⅛" diameter positioned just ahead of a second transfer pump 142. The output side of second transfer pump 142 is fluidly connected to centrifuge vessel 144 shown in FIG. 2b by line 146. Thus, when valve 138 is opened and second transfer pump 142 is energized, the heated and agitated waste ink will be pumped from waste ink heating and agitating unit 124 through lines 136 and 146 and into centrifuge vessel 144. The centrifuge vessel 144 is rotatably mounted on shaft 148 held by frame 150. Shaft 148 is rotated by motor 152, thereby turning centrifuge vessel 144 at a preset rotational velocity. Centrifugation of the waste ink effects separation of the solid matter contained therein from the clean ink fraction. The clarified ink fraction so obtained is then transferred or drained from centrifuge vessel 144 through line 154 into clarified ink catch tank 156. The solid particulate matter removed by centrifugation is subsequently removed from the centrifuge vessel 156 and is discarded as waste.

Clarified ink catch tank 156 is provided with a bottom drain port 158 connected to a drain line 160. A valve 162 is positioned in line 160 near the drain port 158 of clarified ink catch tank 156. A third strainer 164 having an internal screen diameter of approximately 200 microns is positioned in line 160 just ahead of a third transfer pump 166. The output side of third transfer pump 166 is fluidly connected to a virgin ink/reclaimed ink blend tank 168 by line 170. Thus, when valve 162 is opened and third transfer pump 166 is energized, the clarified ink will be pumped from clean ink catch tank 156 through lines 160 and 170 and into reclaimed ink-/virgin ink blend tank 168. The reclaimed ink/virgin ink blend tank 168 is a generally cylindrical tank having a top cover 172 and a mechanical agitator 174 shown by dotted lines positioned therein. The mechanical agitator 174 is constantly turned at a preset rate by an electric motor 176 mounted on the top cover 172 of the cylindrical blend tank 168. A virgin ink input line 178 is connected to reclaimed ink/virgin ink blend tank 168 through a second input port located in its top cover 172.

Virgin ink line 178 is provided with a two-way valve 180 to control the flow of virgin ink into the reclaimed ink/virgin ink blend tank. When valve 180 is opened and virgin ink is passed through line 178, the virgin ink will enter the reclaimed ink/virgin ink blend tank 168. Thus, separate input lines 170 and 178 are provided to transfer quantities of reclaimed, clarified ink and virgin ink, respectively, into the blend tank 168. The blend tank mixer 174 provides a means of mechanically blending the two liquids at a predetermined ratio to obtain a final blended ink material which is press ready and which exhibits the desired properties such as tack, color, viscosity and pigment content, etc.

Reclaimed ink/virgin ink blend tank 168 is provided with a drain port 182 near its base. Drain port 182 is connected to line 184. Line 184 is provided with a two-way valve 186 proximal to drain port 182. A fourth strainer 184, having an approximate 100 micron screen size is positioned in line 184 just ahead of a fourth transfer pump 186. The output side of fourth transfer pump 188 is connected to ink line 190. Line 190 fluidly connects fourth transfer pump 186 to the printing press line. Thus, when valve 186 is opened and fourth transfer pump 188 is energized, the reclaimed ink/virgin ink blend will be pumped from reclaimed ink/virgin ink blend tank 168 through lines 184 and 190 to the subject printing press by fourth transfer pump 188.

Sampling ports 200, 202 and 204 are provided in lines 122, 170 and 190 respectively. Sampling ports 200, 202 and 2-4 comprise individual sample output lines connected by Ts into ink lines 122, 170 and 190. Sampling ports 200, 202 and 204 are provided with individual two-way valves 206, 208 and 210 respectively. Thus, when two-way valve 206 is open, a sample of waste ink may be obtained from line 122 through sample port 200. When two-way valve 208 is opened a sample of clarified ink may be obtained from line 170 through sample port 202. Likewise, when valve 210 is open, a sample of clarified reclaimed ink/virgin ink blend may be obtained from line 190 through sample port 204.

If the ink sampled at any point of the system is not acceptable or outside prescribed specifications it may, of course, be redeposited in the waste in dump tank 104 or heating and agitation vessel 124 and once again subjected to the inventive process.

Thus, by the above-described system of apparatus, virgin ink contained in drums 100 is dumped by dumping device 102 into virgin ink dump tank 14. Upon reaching a predetermined level within waste ink dump tank 104, liquid level indicator 120 will signal the opening of valve 114 and actuation of transfer pump 118, thereby draining the waste ink from waste ink dump tank 104 through lines 112 and 122 and into the waste ink heating and agitating vessel 124. The waste ink will be held within waste ink heating and agitating vessel 124 for a time period (approximately 12 to 14 hours) and at a temperature (approximately 180 degrees F.), sufficient to volatilize excess water and blanket wash solvents contained therein and to lower the viscosity of the waste ink for subsequent centrifugation and processing. Any water, blanket wash solvents, or other liquid contaminants which are vaporized during heating will be vented through vent port 132 and may be exhausted to the exterior of the building in which the ink reclamation system is housed or may be plumbed into a separate pollution abatement system. At the end of the heating and agitation period, valve 138 is opened and pump 142 is energized, thereby pumping the heated and agitated waste ink from heating and agitating vessel 124 through ⅛" strainer 140 and lines 136 and 146 and into centrifuge 144. After centrifugation, the clarified ink is drained from centrifuge 144 through line 154 and is collected in clarified ink catch tank 156. The solid matter separated during centrifugation is contained within centrifuge 144 and will be subsequently removed and discarded.

When clean ink catch tank 156 becomes sufficiently full, valve 162 may be opened and third transfer pump 166 is energized, thereby transferring the clarified ink from catch tank 156 through 20 micron strainer 164, lines 160 and 170 and into the ink blend tank 168. A metered or otherwise measured quantity of virgin ink is then passed through virgin ink line 178 into blend tank 168 along with the clarified ink. Agitator 174 is rotated, thereby mixing the clarified ink with the virgin ink within blend tank 168. After obtaining a blend of reclaimed ink/virgin ink which provides the desired properties, such blended ink is deemed to be press ready and may be sent to the printing presses. This is done by opening valve 186 and energizing fourth transfer pump 188, thereby pumping the reclaimed ink/virgin ink blend from reclaimed ink/virgin ink blend tank 168 through lines 184 and 190 to the printing press.

Of course, the various steps of the process may be automatically controlled to minimize the likelihood of human error and to improve efficiency. Specifically, the temperature within heating and agitating vessel 124 may be automatically maintained by thermostating of heating unit 130. The residence time within the heating and agitating vessel may also be controlled by a timer adapted to open valve 114 and energize second transfer pump 118 at the end of a preset time period (i.e. 15 hours) Alarms and/or failsafe devices may be built into the system to insure that the desired temperature and agitation are maintained throughout the entire residence period. If, for example, the temperature should fall below a preset level, such failsafe device may be adapted to prevent a functioning timer/control from opening valve 114 or energizing second transfer pump 119, the result being that the inadequately heated waste ink will remain in the heating and agitating vessel 124 until the problem can be corrected. Automated viscosity monitoring equipment may also be used to insure that the waste ink has been subjected to sufficient heating and agitation to lower the viscosity into a processable range.

Likewise, a liquid level sensor, similar to the liquid level sensor 120 described above in connection with waste ink dump tank 104 may be positioned within clarified ink catch tank 156 and operatively connected to valve 162 and third transfer pump 166 such that valve 162 will open and third transfer pump 166 will be energized when the quantity of ink contained in the clarified ink catch tank 156 reaches a predetermined level. Alternatively, the clarified ink may be manually or automatically transferred from clarified ink catch tank 156 in a batch to batch manner or on the basis of monitored interruptions in flow through line 154 which drains centrifuge 156.

The invention has been described with reference to a preferred embodiment thereof. Obviously, modifications and alterations will occur to those reading and understanding this specification. It is, however, my intention to include all such modifications and alterations insofar as the come within the scope of the appended claims or the equivalents thereof.

What is claimed is:

1. An improved method for reclaiming undiluted printing ink containing solid contaminants, said method comprising:
    (a) heating and agitating said undiluted waste ink until said waste ink is substantially homogeneous in consistency and sufficiently low in viscosity to permit subsequent centrifugation and processing thereof;
    (b) thereafter, centrifuging said heated and agitated undiluted waste ink to separate said solid contaminants from said waste ink and to thereby produce a clarified reclaimed ink; and
    (c) thereafter blending said clarified reclaimed ink with a quantity of virgin ink to produce a clarified ink/virgin ink mixture having desired properties.

2. The method of claim 1 wherein said heating and agitating of said undiluted waste ink is maintained at a temperature and for a period of time sufficient to vaporize excess water and volatile wash solvents contained therein.

3. The method of claim 2 wherein said temperature is approximately 180 degrees F.

4. The method of claim 2 wherein said period of time is approximately 12 to 14 hours.

5. The method of claim 1 wherein the viscosity of said undiluted waste ink is reduced to or below approximately 60 poise after said heating and agitation.

6. The method of claim 1 including an initial step of pooling said waste ink in a waste ink dump tank until such time as a predetermined quantity of waste ink has been collected and thereafter subjecting said waste ink to the steps recited in claim 1.

7. The method of claim 6 wherein said pooled waste ink is permitted to stand for a period of time sufficient to allow at least a portion of any liquid contaminants having specific gravities lower than that of said waste ink, to separate and form a layer on the top surface of said pooled waste.

8. The method of claim 7 wherein said ink is pooled for a period of at least 8 hours.

9. An improved method for reclaiming undiluted waste printing ink having extraneous water and solid contaminants contained therein and having a viscosity at ambient temperature in excess of approximately 200 poise, said method comprising the steps of:
    (a) providing a quantity of the undiluted waste ink;
    (b) warming said undiluted waste ink to a temperature generally around 180 ° F. and maintaining such elevated temperature with concomitant agitation of the undiluted waste ink for a period of time sufficient to promote evaporization of at least some of the extraneous water contained therein and to reduce the viscosity of the undiluted waste ink to a viscosity at which the waste ink may be easily pumped and centrifuged; and
    (c) thereafter, subjecting the heated and agitated undiluted waste ink to angular acceleration sufficient to cause separation of at least a substantial portion of the solid contaminants contained therein, thereby producing undiluted, clarified reclaimed ink.

10. The method of claim 9 including the additional step of:
    (d) thereafter, blending the undiluted clarified ink with a quantity of virgin ink to obtain a clarified ink/virgin ink blend having desired properties.

11. The method of claim 9 wherein the step of (a) providing a quantity of undiluted waste ink comprises:

holding a quantity of undiluted waste ink in a holding vessel for a period of time sufficient to allow at least a portion of any liquid contaminants having specific gravities lower than that of the waste ink to separate and form a layer on top of said quantity of waste ink.

12. The method of claim 9 wherein said viscosity at which the waste ink may be pumped and centrifuged is equal to or less than 60 poise.

* * * * *